No. 797,554. PATENTED AUG. 22, 1905.
A. B. CALKINS.
JIG SAW.
APPLICATION FILED AUG. 20, 1904.

3 SHEETS—SHEET 1.

WITNESSES:
Harry F. Goss.
Herbert Burdick

INVENTOR
Alvum B. Calkins
BY
Chapin Rayford Marble
his ATTORNEYS

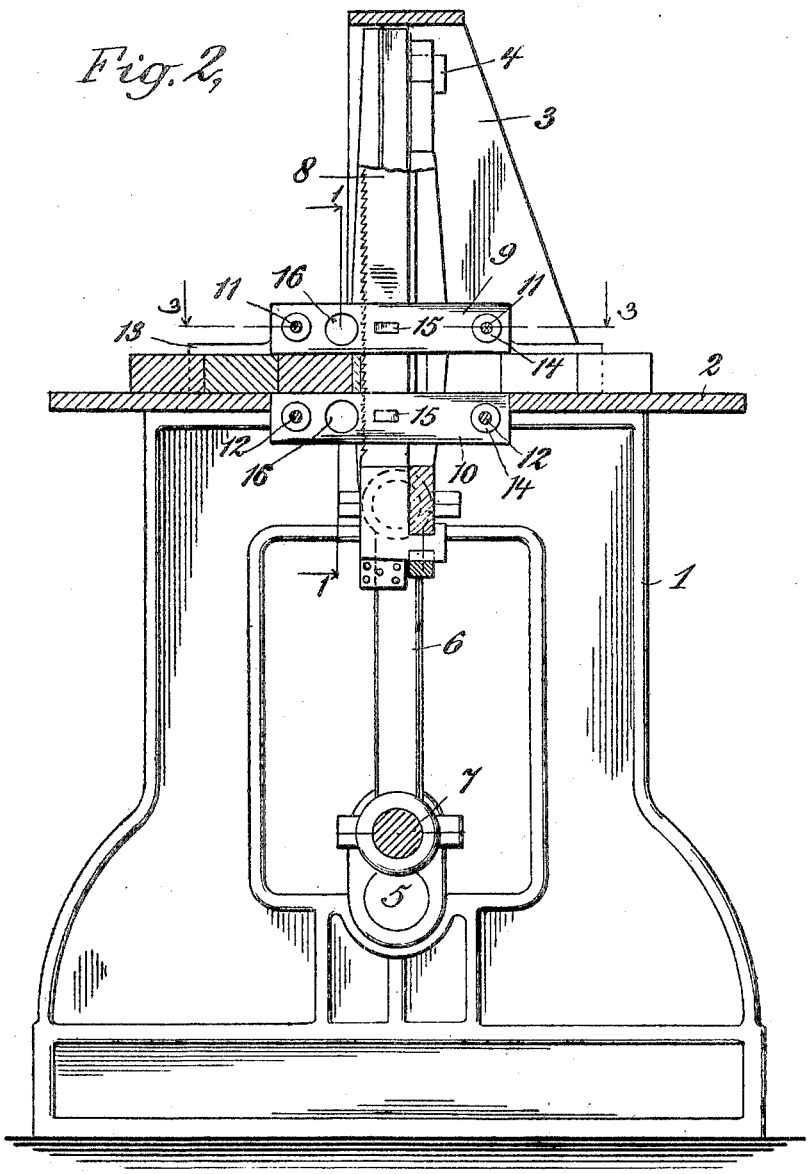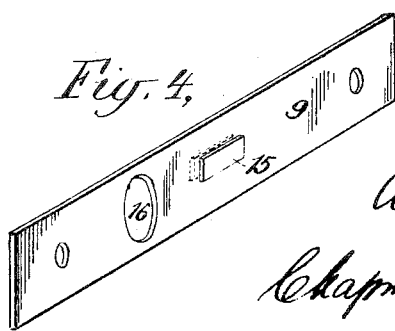

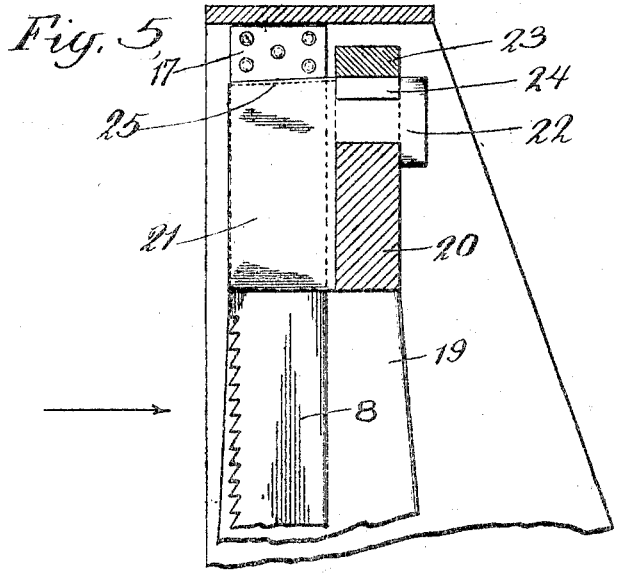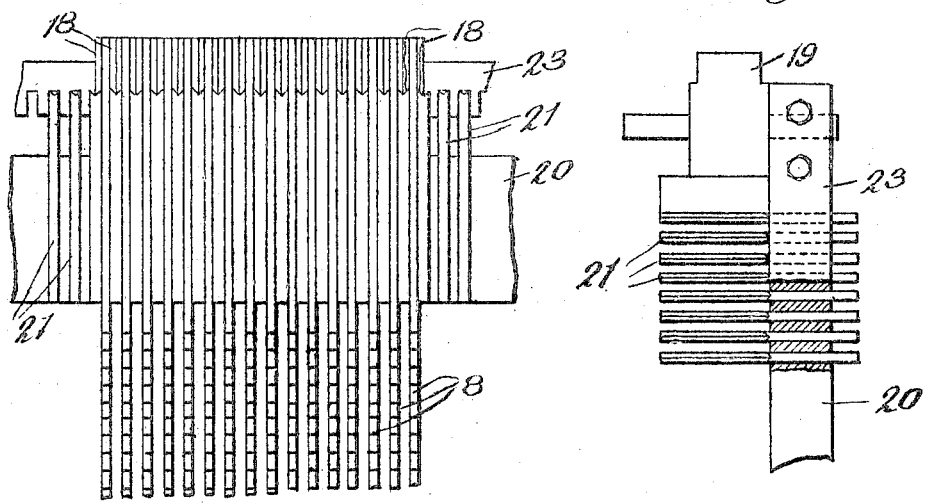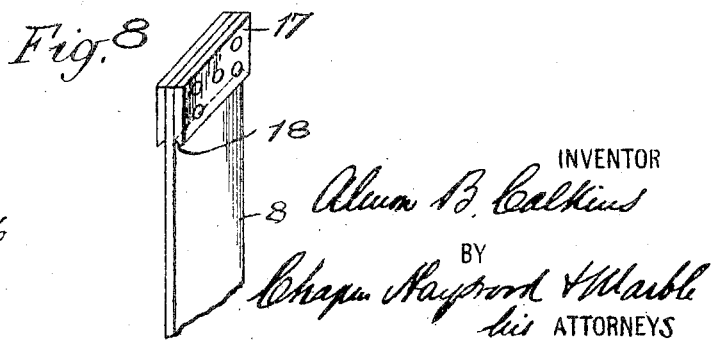

UNITED STATES PATENT OFFICE.

ALMON B. CALKINS, OF BELLEVILLE, NEW JERSEY, ASSIGNOR TO AMERICAN MATCH MANUFACTURING COMPANY, OF NEW YORK, N. Y., A CORPORATION OF NEW JERSEY.

JIG-SAW.

No. 797,554.      Specification of Letters Patent.      Patented Aug. 22, 1905.

Application filed August 20, 1904. Serial No. 221,477.

*To all whom it may concern:*

Be it known that I, ALMON B. CALKINS, a citizen of the United States of America, and a resident of Belleville, county of Essex, State of New Jersey, have invented certain new and useful Improvements in Jig-Saws, of which the following is a specification, reference being had to the accompanying drawings, forming a part thereof.

My invention relates to improvements in jig-saws, and particularly to means therein for guiding the saws and conveying the sawdust away from the faces thereof, and to means for mounting the saws.

My invention consists in steadying devices for steadying the saws above and below the work operated upon, in certain ducts or channels to be presently described, constituting exhaust-passages for receiving and conveying away the sawdust, and in improved means for supporting saw-blades at opposite ends thereof in the frame in which they are carried, whereby they will be held under suitable tension and whereby the tendency of such tension will be rather to increase in the operation thereof than to decrease.

In order that my invention may be fully understood, I will describe particularly in detail an embodiment thereof and will then point out the novel features in claims.

Figure 1:
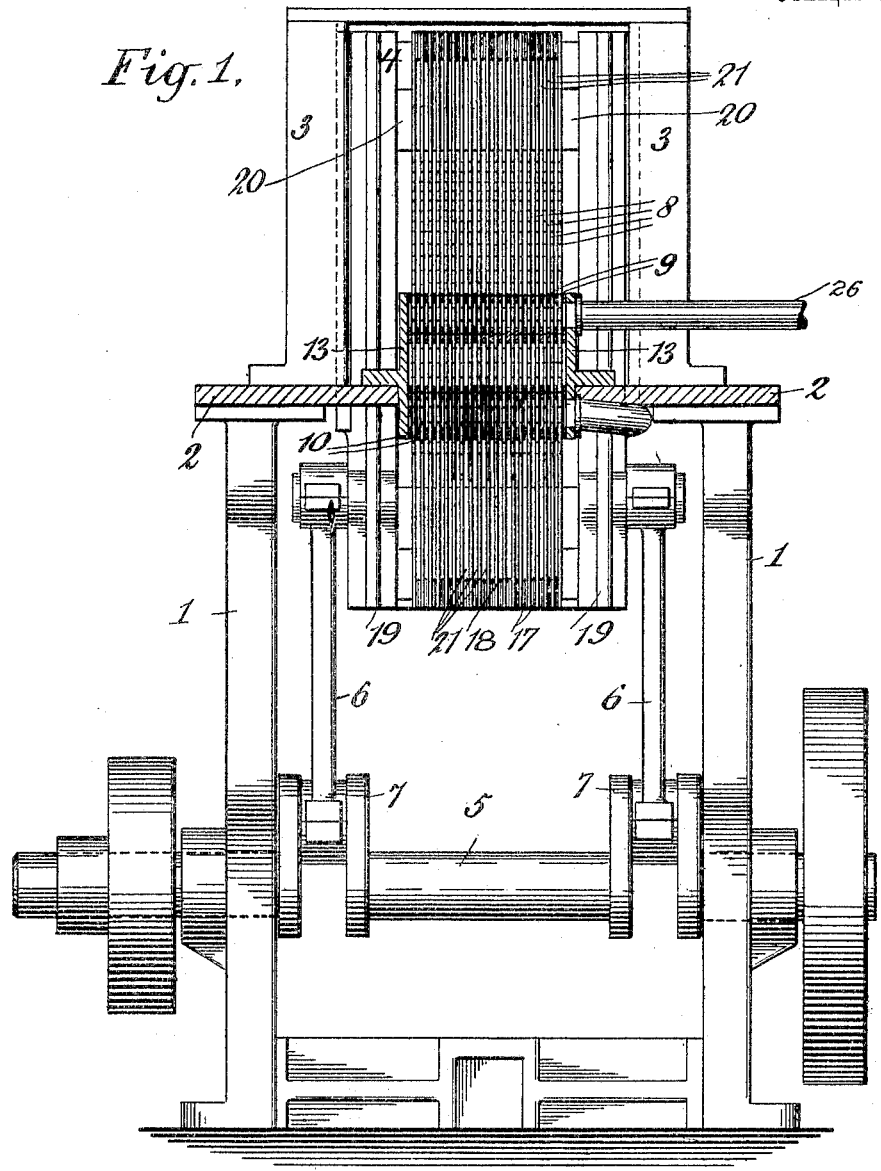
Figure 3:
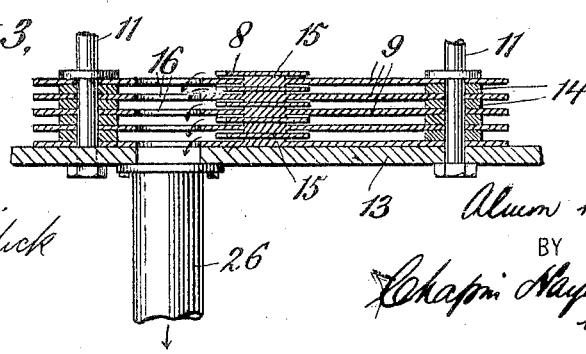

In the drawings, Figure 1 is a view in front elevation of a machine embodying my invention, certain parts being shown in section upon the plane of the line 1 1 of Fig. 2. Fig. 2 is a view in central transverse section through the machine. Fig. 3 is an enlarged detail view in horizontal section, the plane of section being upon the line 3 3 of Fig. 2. Fig. 4 is a detail view in perspective of one of the guides or steadying devices removed from the machine. Fig. 5 is a detail view of the upper portion of the saw-frame in transverse vertical section, showing particularly the means for mounting the saw-blades in position therein. Fig. 6 is a face view thereof. Fig. 7 is a partial top view and a view partially in section of the same. Fig. 8 is a detail view in perspective of one end of one of the saw-blades.

The frame 1 of the machine supports the work bed or table 2, the usual guides 3 for the reciprocating saw-frame 4, and bearings for the drive-shaft 5. Connecting-rods 6 connect the saw-frame with crank portions 7 of the shaft 5, whereby rotary movement of the shaft 5 produces reciprocation of the saw-frame 4. Saw-blades 8 are secured to and carried by the saw-frame in a manner to be presently described. Two sets of bars 9 10 are located between the saw-blades 8, said bars supported upon rods 11 and 12, carried by brackets 13, supported upon the table 2. The said bars are of a width somewhat less than the distance between contiguous saw-blades and are therefore maintained out of contact therewith. Washers or thimbles 14 act as spacing-pieces to properly space the said bars apart. The bars are provided on their opposite faces with bearing projections 15, which are arranged to engage the side faces of the saws, so as to steady them and maintain them a proper distance apart. The lower set of bars 10 are arranged, preferably, with their upper edges about flush with the upper face of the table 2, and the upper set of bars 9 are arranged at such a distance above the surface of the table as just to clear the work fed beneath them. The bars, with their projections 15, then act as steadying devices for the saws above and below the work. I have found when such steadying devices are employed that it is exceedingly difficult to clear the saws of sawdust, because the sawdust is apt to cake between the saws and the bars, and for the purposes of overcoming this difficulty I have provided channels formed by perforating the bars immediately in front of the saws, as at 16, and connecting the channels so formed with an exhaust-pipe 26. In this manner sawdust as it is formed will be carried away from the surface of the teeth and through the channels 16 to the exhaust-pipe 26, preventing it from caking and clogging the saws. The arrows in Fig. 3 show the direction of the air-currents, and it will be noticed that the restricted passages between the saw-blades and the side faces of the bars 9 and 10 in which the sawdust is apt to clog unless some means are provided for carrying it away are directly exposed to the full force of the suction, so that a continuous stream of air will be induced therethrough, positively preventing any accumulation.

In order to mount the saw-blades in the frame, I provide the opposite ends on both sides thereof with plates 17, firmly secured thereto, as by riveting. The lower edge of the plates 17 are beveled transversely, as at 18, such bevel being preferably at about an angle of forty-five degrees, and the said edge is also slightly inclined rearwardly.

The frame 4 comprises longitudinal uprights 19 and transverse hanger-bars 20, rigidly secured thereto. Spacing-plates 21, provided with rearwardly-extending hook-shaped portions 22, are hung upon the transverse hanger-bars 20, the thickness of said spacing-pieces being just the distance desired between the saw-blades. Retaining-bars 23, bolted or otherwise secured to the transverse bar 20, engage the rearward extensions of the plates 21 and hold same in position. The retaining-bars 23 have depending fingers 24 exactly equal to the thickness of the saw-blades, so as to correctly space the spacing-pieces apart before the saws are mounted in position. The outer edges 25 of the plates 21 have slight forward inclinations corresponding to the rearward inclinations of the coacting faces 18 of the plates 17 and are further grooved angularly, as shown, so as to also fit the transversely-beveled faces 18.

By the foregoing construction it will be seen that the saw-blades provided with the plates 17 may be mounted in position by being inserted between the spacing-plates 21 and lightly hammered into place. The transversely-beveled faces of the coacting plates 17 and 21 will prevent any tendency of the saws and the spacing-bars to spring apart, while the coacting inclined faces in a forward and rearward direction will act as a wedge to apply tension to the saws individually, so that each saw-blade will be individually held firmly in position under the desired tension. The pressure of the work-feed being in the direction of the arrow, Fig. 5, the constant tendency will be to tighten the saws and increase the tension thereof rather than to lessen same, while at the same time should it be desired to remove or replace a saw-blade any single saw-blade may be readily dismounted without interfering with any of the other saw-blades and a new blade quickly adjusted in position. It will also be seen that the arrangement is a very compact one, partly owing to the fact that the spacing-pieces overhang the transverse hanger-bars, permitting the saws to extend in front thereof.

It will be obvious that the foregoing is but one embodiment of my invention and that the same is capable of many and varied modifications within the spirit and scope of my invention, and, further, that certain parts may be employed in connection with other parts of different construction. Hence I do not desire to be limited only to the precise details of construction and combination of parts herein.

What I claim is—

1. The combination with a reciprocating saw-blade, of a guide-bar having a lateral projection for engaging the saw, and having a transverse hole therethrough for the passage of sawdust and air-currents, substantially as specified.

2. The combination with a plurality of reciprocating saw-blades, of spacing-bars located between them, said bars having lateral projections upon opposite sides thereof for engaging adjacent side faces of the saws, and provided with air and sawdust channels comprising a plurality of transverse holes in the said spacing-bars, in register with each other, substantially as set forth.

3. The combination with a plurality of reciprocating saw-blades, of spacing-bars located between them, said bars having lateral projections upon opposite sides thereof for engaging adjacent side faces of the saws, and provided with means for carrying away sawdust comprising transverse spacing-bars in register with each other, and located in proximity to the cutting edges of the saws.

4. The combination with a plurality of reciprocating saw-blades, of spacing-bars located between them, said bars having lateral projections upon opposite sides thereof for engaging adjacent side faces of the saws, said bars having transverse openings 16 therein, located in proximity to the cutting edges of the saws and transverse of the plane of reciprocation thereof, substantially as set forth.

5. The combination with a saw-frame including transverse hanger-bars, of overhanging spacing-plates engaging same and having forwardly-inclined and transversely-beveled faces for supporting saws, of a plurality of saw-blades having lateral abutments with rearwardly-inclined undercut faces fitted to the beveled faces of the said spacing and supporting plates, the supporting portions of the plates, and the saws supported thereby, arranged in front of the said transverse hanger-bars.

6. The combination with a saw-frame, including a transverse plate 20, of a plurality of spacing-plates 21 having rearwardly-extending hook-shaped portions 22 engaging said cross-bar 20, and having forwardly-inclined faces 25, of a plurality of saw-blades having lateral abutments thereon arranged to engage the faces 25, and rearwardly inclined to correspond therewith.

7. The combination with a saw-frame, including a transverse bar 20 and a plurality of spacing-plates 21 having rearwardly-extending hook-shaped portions 22 hung upon said transverse bar 20, of a retaining-bar 23 having fingers 24 for correctly spacing the said spacing-pieces, the upper edges 25 of said spacing-pieces inclined substantially as set forth.

ALMON B. CALKINS.

Witnesses:
W. A. DOWNS,
CHAS. W. DRAKE.